United States Patent

[11] 3,607,489

| [72] | Inventor | Jonas Anders Göte Helgesson<br>Vallentuma, Sweden |
|---|---|---|
| [21] | Appl. No. | 734,946 |
| [22] | Filed | June 6, 1968 |
| [45] | Patented | Sept. 21, 1971 |
| [73] | Assignee | Ingenjorsfirman B-Projekt Aktiebolag<br>Stockholms-vagen, Enebyberg, Sweden |
| [32] | Priority | Dec. 18, 1967 |
| [33] | | Sweden |
| [31] | | 17344/1967 |

[54] METHOD FOR MANUFACTURE OF COATED BOARDS MADE OF WOOD SHAVINGS, FIBERS AND SIMILAR MATERIALS
13 Claims, 3 Drawing Figs.

[52] U.S. Cl. ........................................................ 156/62.2,
156/376, 264/113
[51] Int. Cl. ........................................................ B29j 5/06,
B29j 5/08

[50] Field of Search .......................................... 156/62.2;
264/113

[56] References Cited
FOREIGN PATENTS
965,108   7/1964   Great Britain ................   156/62.2

*Primary Examiner*—Leland A. Sebastian
*Attorney*—Bauer & Goodman

ABSTRACT: The invention provides method and apparatus for the manufacture of pressed synthetic fiberboard. A continuous web containing a layer of particulate material is drawn to a hot press having a stationary lower plate, pressed to form the fiberboard, and withdrawn from the press. The said web and consequent pressed fiberboard are moved to and through the press under traction provided by a traction means pulling the pressed fiberboard from the press cooperating with a braking means acting on the web at a position before said web is charged with the layer of particulate material.

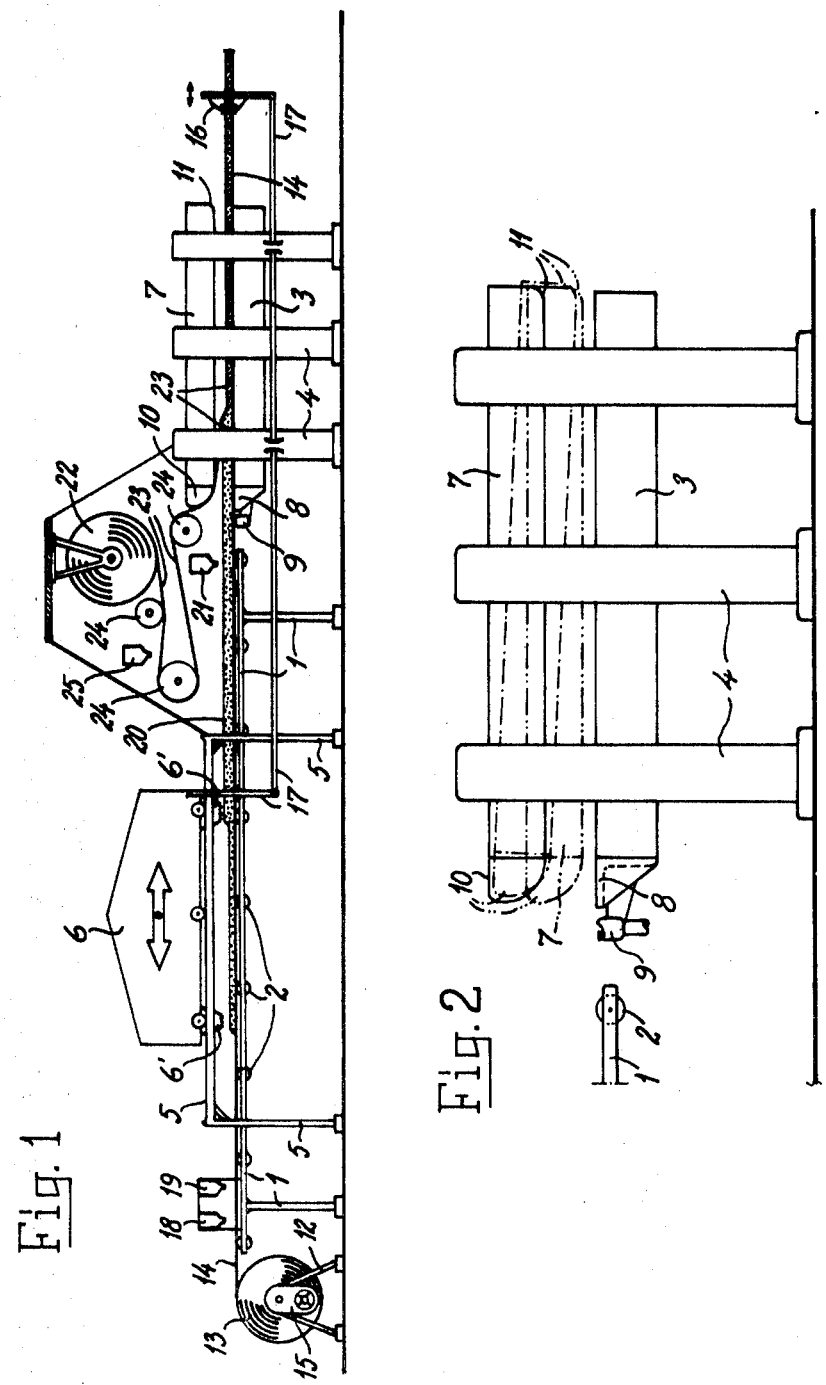

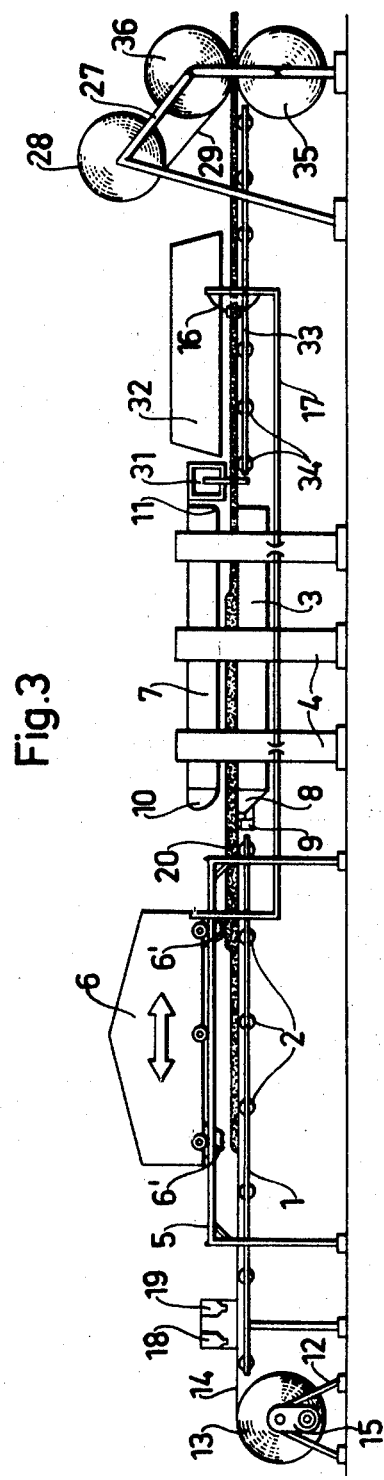

METHOD FOR MANUFACTURE OF COATED BOARDS MADE OF WOOD SHAVINGS, FIBERS AND SIMILAR MATERIALS

This invention relates to manufacture of coated boards made of a vegetable material having the form of particles.

More particularly this invention relates to the manufacture of hot-pressed, resin-cemented boards made of a vegetable material having the form of particles, preferably wood shavings or fibers, and coated on at least one of its faces with a surface coating formed by a separate sheeting.

It is well known per se to provide such boards with a coating of paper, fabric or some other film on one or both faces thereof. This so-called laminating can either be made directly on an already finished compressed board unit or on a board blank which has been precompressed without completely obtaining the final degree of compression. Usually in this connection, paper impregnated with synthetic resin is used in several layers which are caused to bond together simultaneously with the uniting of the coating under heat and pressure to the board core proper.

This known method of manufacturing laminated boards of vegetable, finely distributed particle material is relatively expensive, because it requires at least two pressing operations to arrive at the final product, and in addition the laminating process proper is rather complicated, because it is necessary carefully to attend thereto that the coating layer is prevented from becoming creased or wrinkled in connection with its application to the core.

The present invention has been developed on the base of the observation that so-called particle boards ought to achieve a substantially increased utilization in house building and interior fitting if their coating on at least one face could be carried out in a rational and economic way. It has been ascertained by experiments that a sufficient improvement of the surface would be obtainable for particle boards by applicating on one or both faces thereof an entirely nonimpregnated paper web, although there is also the possibility of meeting much higher objectives by utilizing other, possibly specifically treated coatings. The difficulties arising in connection therewith have thus been ascertained to reside primarily in the necessity of providing an economical process of manufacture which renders possible a substantial reduction of the manufacturing costs for the coated particle board products.

One main object of the invention is to present a solution of the problems in consideration by providing a method of manufacturing the products envisaged above in a simpler and cheaper way than hitherto has been possible.

According to a main feature of the invention the material pretreated with a synthetic resin adhesive is in required layer thickness applied onto a thin coating strip or web which is displayed over a discontinuous support and is fed from a supply roller in continuous or coherent state past a material measuring and supplying device and advanced to a lower hot-press plate collaborating with a vertically displaceable upper hot-press plate for compression, bonding and simultaneous anchoring of the particle material to the strip or web, which is kept stretched while being utilized for carrying the particle material over the discontinuities of the support prior to the cutting of the compressed product into individual board units.

Another object of the invention is to provide a method which renders possible to manufacture the finished coated product in a single pressing operation.

Many important advantages are gained by application of the invention which all coact considerably to reduce the costs of manufacturing the coated board product. One of these advantages is that it becomes unnecessary to use so-called conveyor plates or endless steel belts for supporting the blanks in progress of manufacture on their way to and through the press. Another advantage is that in most cases the costs for an additional supply of adhesive onto the coating STRIP or web can be evaded since the synthetic resin adhesive with which the particles already have been treated prior to their positioning on the strip or web normally is sufficient for ensuring in connection with the hot-pressing operation a reliable bond between the board core and the face coating layer. A third advantage is that one has not to handle individual pieces of semifinished blanks and can principally operate continuously even if the pressing operation proper preferably, but not necessarily is performed stepwise. The utilization of the coating strip or web as carrier of the particles over a discontinuous support has also proved to result in the great technical advantage that the danger is avoided that shavings, fibers and other particles are carried along on the underside of the strip or web into the press for there to be pressed into the face of the finished product, which often had so bad influence on the quality of the final product that a larger or minor piece thereof had to be discarded.

The method according to the invention affords also extremely good possibilities to meet specific desires for obtaining specific properties of the coating layer or layers by impregnation, covering or particular treatment of the coating strips or webs or/and the applied particle or fiber layer prior to the pressing operation. Of course, the method of the invention also renders possible to manufacture board products coated on both sides at considerably lower costs than hitherto.

In many cases, such as in the manufacture of cup board doors, room doors etc., it is desirable that both coating layers are diffusion tight to counteract warping of the particle boards due to action of moisture. The coating of the upper face of the boards can then not be performed in the hot press, since the steam should not have any possibility of escaping and therefore should split up the particle or fiber core when the press is opened. Thus, a still further object of the invention is to provide a final product in which the interior core of vegetable particle material has a uniform low moisture content and at the same time is intimately united with the diffusion tight coating on both faces of the board core.

A still further object of the invention is to provide an apparatus for carrying out the method set forth hereinbefore, which apparatus primarily affords the advantage that the costs of investment are very moderate and that simultaneously an economical manufacture is rendered possible by the same.

Further objects and advantages of the invention will become apparent from the following description considered in connection with accompanying drawings which form part of this specification and of which:

FIG. 1 is a partly diagrammatic lateral view of an apparatus for manufacture of hot-pressed particle boards bonded together by synthetic resin and provided with coatings formed by film strips or webs on both faces thereof.

FIG. 2 shows in an enlarged scale but still diagrammatically the structure and the method of operation of the pressing device proper.

FIG. 3 is a diagrammatic lateral view of an apparatus presenting another embodiment.

In both embodiments, reference numerals have been used for denoting equivalent parts.

The apparatus illustrated in FIGS. 1 and 2 comprises a longitudinally extending roller way 1 having a plurality of relatively widely spaced support rollers 2. Positioned at the right end of said roller way 1 according to the drawing is a stationary lower hot-press plate 3, the upper face of which is at the same level as the top lines of the rollers 2. The press plate 3 is supported by a press stand 4 and is in a manner known per se, but not illustrated, heated to required temperature, which does not exceed 100° C. A stand 5 supports over the roller way 1 a particle measuring and supplying device 6, which suitably is formed as a carriage reciprocally displaceable in the longitudinal direction of the roller way 1 and containing one or several containers for shavings treated with synthetic resin adhesive. The particle measuring and supplying device is in its bottom provided with one or several particle discharging means 6', which are capable to discharge pretreated particles, primarily shavings, in equal layers.

Above the stationary lower hot-press plate 3, the press stand 4 carries an upper, vertically movable hot-press plate 7, which is adapted to be forced in downward direction against the plate 3 with a specific pressing pressure of at least 12 kps/cm.² The edge of the lower press plate 3 facing the roller way 1 is provided with a suitably nonheated prolongation 8 of its upper plane which projects over or beyond the corresponding edge of the lower plane face of the upper press plate 7. Between the outer edge of said prolongation and the nearest adjacent roller 2 of the roller way 1, a cleaning device 9 may be provided, which device may have the form of a brusher equipment, some kind of vacuum cleaner, and exhaust nozzle for compressed air or a combination of such means.

The upper movable press plate 7 can at its edge facing the roller way 1 be provided with a continuation 10 having a lower face directed obliquely upwards and formed with a convex rounding, which face is positioned substantially vertically above the prolongation 8 of the lower press plate 3. The edge remote in relation to the roller way 1 of the upper press plate 7 is also suitably slightly curved as is indicated at 11. Also the press plate 7 is in a manner not shown more in detail arranged to be heated to at least 100° C. at its plane lower face and may further be mounted so that it in its movement towards the stationary lower press plate is movable in such a manner that its end remote from the roller way 1 initially is lowered with a higher speed than the opposite end facing the roller way so that the press plate 7 at an intermediate stage of the pressing operation will take an inclined position (as is indicated in FIG. 2) before its end facing the roller way 1 in turn has been lowered sufficiently much to cause the movable press plate under the last stage of its pressing movement to take a position parallel to the lower press plate 3. The press plate 7 is at the same time slightly movable in its longitudinal direction—and thus in that of the roller way 1—in relation to the press stand 4 and the lower press plate 3. Under its upward movement, the press plate 7 is, of course, displaceable in parallel in normal manner.

Dispose at the end of the roller way 1 remote from the press is a suitable carrier 12 for a supply roll 13 of a web 14 of paper, for example, which is displayed over the discontinuous support formed by the roller way 1 and the lower press plate 3 together. The supply roll 13 is under the action of a brake device 15 carried by the carrier 12 and preferably comprising an electric motor tending to rotate the supply roll 13 in such a direction (counterclockwise in FIG. 1) that the paper web 14 displayed over the roller way 1 would be wound up on the supply roll 13 if its free end were not retained, said electric motor being either devised so as to allow that its anchor is braked up to a standstill in a rotating electric magnetic field or coupled to the supply roll through a sliding clutch so that the motor only tends to keep the paper web 14 firmly stretched. In practical realization the apparatus is most suitably provided with at least two carriers for supply rolls so that one is in a position when the paper web on the one supply roll becomes used up without any complicated and time wasting replacing operation to adjoin the free end of a new paper web and thus to have the process of manufacture to continue without substantial interruption. Instead of disposing the brake device 15 so as directly to act on the supply roll 13 it is, of course, possible to cause the brake device to act on two or more rollers between which the paper web 14 is forced to pass. This can be more advantageous when its is question of joining several webs together in a sequence.

As already mentioned, the web 14 is displayed over the discontinuous support formed by the roller way 1 and the lower press plate 3 and is kept firmly stretched over the same by means of the above-mentioned brake device 15 as a result of the retaining of the free end of the web either between the press plates 3, 7 brought together or, when the press is open, by a catching device indicated at 16 and adapted to cooperate with the finished product. The catching device 16 is reciprocately movable in the longitudinal direction of the apparatus under the actuation of a driving device not shown and it is devised to move at left hand in FIG. 1—and then not to engage the finished products—when the press plates 3, 7 are brought together, and to the right hand and thereby to draw the just-finished portion of the product out of the press when the press plates are being brought apart. This removal of the portion just finally pressed out of the press implies of course, a stepwise advance of the whole web 14 over the roller way 10. The catching device 16 can to advantage be mechanically coupled together with the particle measuring and supplying device 6 as is indicated by the coupling members 17 so that also the particle measuring and supplying device will move reciprocately while displaying the shavings treated with synthetic adhesive over the web 14 stretched over the roller way 1. This has proved to be advantageous from a plurality of viewpoints, since it otherwise encounters some difficulties to distribute the particles such as the shavings on the paper web 14 in a satisfying manner solely during the short period when the web is advanced over a distance which essentially corresponds to the length of the press plates 3, 7. By use of specifically designed particle measuring and supplying devices, such uniform distribution can, however, be realized, in which case the particle-supplying device can be disposed stationarily above the roller way 1. Of course, the particle measuring and supplying device must under all events be formed so as to display on the underlying stretched web 14 a particle layer 20 of required uniform thickness to enable forming of the particle board core of the final product.

Before the stretched, particles supporting web 14 reaches the position below the particle measuring and supplying device 6 it may be advanced, if desired, below and past one or several nozzles 18, 19 by means of which suitable means, for example in liquid condition, can be fed to the upper face of the web 14. These means may, for example, have for their purpose to increase the resistance of the web against moisture, fire, attacks by insects, its density, surface structure, color or capability of receiving means for a subsequent surface treatment and/or the capability of the web firmly to adhere to the hot-pressed particle board core in the final product. It should, however, be observed that all such pretreatment of the web 14 is entirely voluntary and in the plurality of cases not at all necessary to obtain the desired product. Of course, it is also conceivable to treat at the same time also the lower face of the web 14 in a desired manner, for example by spraying thereon suitable agents by means of nozzles located below the web and not shown in the drawings. After that the web 14 below the particle measuring and supplying device 6 has been covered with a particle layer 20 of desired thickness, it may prior to its entrance between the press plates 3, 7, be advanced past one or several additional nozzle devices 21 by means of which the loosely assembled particles treated with synthetic adhesive can be supplied with means which without preventing the particle board core from firmly being cemented together are capable of improving its resistance against fire, attacks by insects and the like.

As will be understood from the preceding description, the paper web 14 is used as the sole carrier of the particle layer 20 when it is advanced over the spaced rollers 2 of the roller way 1 over which rollers the paper web is stretched firmly. The danger of shavings or other impurities adhering to the lower face of the paper web 14 thereby impairing the quality of the final product is substantially eliminated in this way, but for the sake of safety, the apparatus may, as already mentioned above, be additionally equipped with the cleaning device 9 located immediately ahead of the entrance end of the press where impurities of said kind adhering to the lower face of the web 14 can be effectively removed before the web covered with particles is drawn onto the exactly evenly ground upper face of the lower hot-press plate 3. The utilization of the paper web 14 as the sole carrier of the particle layer eliminates entirely the necessity of separate conveyor plates and endless steel belts which also had to pass through the press and make the apparatus much more expensive and complicated and the use of which would substantially increase the danger of impurities impairing the surface to be carried along into the press, but on the other hand, said utilization requires a very high tensile strength of the paper forming the web 14. Tests have made evident that it is almost impossible to use a paper having a lower sheet weight than 80 grams per square meter and, at least when using wholly unimpregnated paper, arc weights of 120 grams per square meter and more are to be preferred. At all events, even when using wholly unimpregnated paper for the web 14, it has proved possible to attain a reliable bond between the particle board core and the paper web without any addition of further adhesive or the like on the latter which to a high degree reduces the costs for the manufacture of the simplest but simultaneously most attractive product.

As shown in FIG. 1, a second supply roll 22 is supported between the particle measuring and supplying device 6 and the upper press plate 7, from which roll another paper web 23 is drawn off over a plurality of rollers 24 and down over the lower face of the extension 10 on the press plate 7 so that the paper web 23 will cover the particle layer 20 and firmly be bonded onto the particle board core in connection with the compression thereof. Also the paper web 23 can be advanced past one or several nozzles 25 by means of which suitable agents for pretreatment of the paper web can be supplied. The paper web 23 may be of the same quality as the paper web 14 but it may also be of an entirely other kind because the demand on high tensile strength not necessarily must be met. It should be reminded that the upper paper web 23 well may be spared if it is desired to manufacture a particle board product which is covered by a paper laminate on one face only. To the extent that the paper web 23 is used it is advanced stepwise through the press in the same manner as the lower paper web 14 when the catching device 16 draws the portion of the product just finally pressed out from the interspace between the press plates spaced apart at that moment. The paper web 23 will then slide down underneath the prolongation 10 and become attached to the upper face of the particle layer 20. In the subsequent pressing operation during which the upper press plate 7 performs the tilting movement described hereinbefore, the upper paper web will be stretched and smoothed out during the first part of the particle compression so that formation of creases and the like is effectively counteracted. In this way a final product can be obtained on which it is almost impossible to percept that the press has worked stepwise. The final product may, of course, be cut off in known manner at any desired place outside the press.

As will be easily understood, a great deal of alterations can be made with regard to the apparatus shown without thereby jeopardizing the final result aimed at. Thus, the roller way 1 with its support rollers 2 can be replaced by a bench having a plurality of sliding surfaces for the paper web 14. The catching device 16 for the finished product can be formed in a plurality of manners, but most suitably it should coact with the edge portions of the final product. Instead of using wholly unimpregnated paper webs for the forming of the surface coating it is also possible to use paper webs impregnated with synthetic resin, or patterned or prepared in some other way, the only indispensable condition being that the supporting paper web 14 must have sufficient tensile strength to fulfill its particles carrying function during their passage over the discontinuous support. If the finished product is presupposed to be cut into units having a length corresponding to that of the press plates, a press can be utilized the upper press plate of which is conventionally disposed to be displaced in parallel when advanced against the lower press plate because in such a case it is an easy task to locate the cutting lines so that possible creases and other unevenesses on the upper face of the finished product will be positioned within those edge portions of the final board units which as a rule always are cut off prior to utilization of the board units.

It has been established that the lower paper web also serves as a heating insulating layer which during the short period when a still noncompressed portion of the product is fed over the lower heat press plate delays the final curing of the synthetic adhesive in the lower part of the particle layer so that this final curing does not take place but after the complete compression of the particle layer. This contributes to a great homogeneity and improved quality of the particle board core. A similar effect can also be observed when possibly using an upper paper web covering the particle layer, but the effect is not so obvious there. The press must be made with exactly ground press plates and in such a manner that the compression position of the upper press plate is exactly defined so that all subsequent machining of the final product by surface grounding can be dispensed with. The paper webs contribute in a high degree to this effect, since they impart to the final product smooth surfaces presenting a structure satisfactory for most fields of utilization and free from large pores.

The surface coating layers can both or one of them in replacement for the paper webs be constituted by a thin web of cloth or laminate of paper and cloth, cloth and plastic foil or paper and plastic foil provided that these laminates can fulfill the same function in the manufacturing process as the paper webs described.

In the embodiment according to FIG. 3, the web 14 is made of a diffusion-tight material such as a plastic film of polyethylene or similar material or a thin aluminum sheet. The diffusion tight material such as a plastic film or a film of bitumen can on one or both sides be coated with a paper sheet. An example of such paperbacked laminate is the duplex waterproof draft.

As in the preceding embodiment, the web 14 is advanced over the discontinuous support constituted by the roller way 1 and the lower press plate 3 and is kept stretched over said support. In the press 3, 7 a compression of the loose layer of cellulose particles such as shavings resting on the web 14 is effected and at the same time the layer is cemented together with the web. However, in the embodiment according to FIG. 3, the upper face of the layer is still uncoated so that vapor can escape undisturbed when the press is opened.

Located adjacent the hot press 3, 7 is a saw member 31 of known kind, which cuts off the compressed particle board strand into individual board units of desired length. The cutting of the particle board strand to obtain individual board units is suitably effected not earlier than after that the compressed portion of the strand has been withdrawn by the catching device 16 and fed below a combined demoistening and cooling device 32, which comprises a hood and pressure fans or similar members collaborating with said hood. Positioned below said device is a roller way 33 provided with driven support rollers 34 and located at the same level as the upper working surface of the press plate 3. The individual board units are conveyed by said rollers towards two driven rollers 35, 36 carried by a base frame 27. Mounted in said base frame is a supply roller 28 from which a web 29 of diffusion tight material as described above is introduced between the individual board units and the upper roller 36.

It is assumed in FIG. 3 that the press plates 3, 7 are spaced apart and that the compressed portion of the board strand is being withdrawn from the press by means of the catching device 16. After that in this manner a portion of the web 14 with a particle layer distributed thereon has arrived between the press plates 3, 7 the upper one is again lowered for performing the subsequent compressing operation. In this position, the web is at a rest and then a cutting action on the board blank portion drawn underneath the device 32 is effected by the saw member 31. This portion thus is composed of a lower face coating and a compressed particle layer cemented together with said coating. This layer is, however, open upwardly so that vapor or moisture contained therein can be removed undisturbed by the cold air supplied by the device 32. Simultaneously, a cooling of the particle layer is brought about.

During this interval the catching device 16 has returned to its left-hand end position shown in the figure. In this returning movement the particle measuring and delivering device 6 is entrained so that a new portion of the web 14 is covered with particles. AFter that one individual board unit has been demoistened below the device 32, it is conveyed by the support rollers to the pair of rollers 35, 36 which the take over the advancing of the board unit while the application from above of the upper web 29 is effected in a continuous operation. The upper roller 36 can be heated so that a film of diffusion tight thermoplastic material contained in the web 27 is molten to solidify again when it is pressed against the cold surface of the particle board and adheres thereto. If the upper web 29 is constituted by thin aluminum sheet or some other nonsticky material an adhesive can be supplied to the lower face of the web prior to the entrance thereof between the rollers.

While several more or less specific embodiments of the invention have been shown and described, it is to be understood that this is for purpose of illustration only and that the invention is not to be limited thereby, but its scope is to be determined by the appended claims.

What I claim is:

1. The method for the manufacture of pressed synthetic resin board of particulate vegetable material having at least one surface covered with a web comprising
   intermittently advancing a tensioned flexible web horizontally past a material-charging means,
   charging a layer of particulate vegetable material on said web,
   conveying said web containing said layer of particulate vegetable material on a horizontal support to a hot press having a lower plate and an upper plate,
   pressing said web containing said particulate vegetable material in said hot press to form a pressed synthetic resin board, and
   advancing said pressed synthetic resin board from said hot-press wherein said web is intermittently advanced by a traction means in contact with said pressed synthetic resin board exiting from said hot press and wherein said web is maintained in tension by the coaction of said web at a position before said particulate vegetable material is charged on to said web.

2. The method of claim 1 wherein said web is unwound from a supply roll and wherein said braking means is a brake applied to said supply roll.

3. The method of claim 1 wherein said web is a pretreated paper web having a sheet weight of at least 80 grams per square meter.

4. The method of claim 3 wherein said web is a pretreated paper web having a sheet weight of at least 120 grams per square meter.

5. The method of claim 3 wherein said web, prior to being charged with said particulate vegetable material, is treated with at least one composition to effect improvement of at least one property of said web.

6. The method of claim 3 wherein said particulate vegetable material is admixed with at least one composition to improve at least one property of said pressed synthetic resin board.

7. The method of claim 3 wherein said web is a nonimpregnated paper sheet.

8. The method of claim 3 wherein the upper surface of said web containing said layer of particulate vegetable material is covered with a flexible layer of sheet material prior to the entrance of said web into said hot-press whereby the pressed synthetic resin board exiting from said hot-press is coated on both surfaces.

9. The method of claim 8 wherein in said hot press, said pressed synthetic resin board is formed by downward movement of said upper plate against said lower plate, and wherein said upper plate moves downward in a tilting fashion with the edge positioned closest to said traction means moving downward and into contact with the web containing particulate vegetable material and then tilting into a position parallel with said lower plate whereby the upper surface of said pressed board is smoothly formed.

10. The method of claim 3 wherein said web containing the layer of particulate vegetable material fed into said hot press does not contain sheet material on its upper surface; wherein said pressed synthetic resin board exiting from said hot press is exposed so that moisture present therein may escape; and wherein a sheet material is then affixed to the upper surface of said pressed synthetic resin board.

11. The method of claim 10 wherein said pressed synthetic resin board exiting from said hot-press is demoistened and cooled by a demoistening and cooling means, and wherein said demoistening and cooling means is positioned between said hot press and said traction means.

12. The method of claim 11 wherein said pressed synthetic resin board exiting from said hot press is cut into individual board units prior to affixing said upper surface layer thereto.

13. The method of claim 12 wherein said pressed synthetic resin board is cut into said individual board units after said pressed synthetic resin board has been demoistened and cooled.

UNITED STATES PATENT OFFICE
CERTIFICATE OF CORRECTION

Patent No. 3,607,489　　　　　　　Dated September 21, 1971

Inventor(s) Joan Anders Gote Helgesson

It is certified that error appears in the above-identified patent and that said Letters Patent are hereby corrected as shown below:

Column 6, line 26, the word "draft" should read --kraft--.

Column 7, line 35, after "said" insert --traction means, said hot press, and a breaking means applied to said--.

Signed and sealed this 11th day of July 1972.

(SEAL)
Attest:

EDWARD M. FLETCHER, JR.　　　　ROBERT GOTTSCHALK
Attesting Officer　　　　　　　　Commissioner of Patents